(12) United States Patent
Sisken

(10) Patent No.: US 7,856,808 B2
(45) Date of Patent: Dec. 28, 2010

(54) METHOD TO RE-OPEN ASH FILLED CHANNELS IN DIESEL PARTICULATE FILTERS

(75) Inventor: Kevin Dean Sisken, Saline, MI (US)

(73) Assignee: Detroit Diesel Corporation, Detroit, MI (US)

( * ) Notice: Subject to any disclaimer, the term of this patent is extended or adjusted under 35 U.S.C. 154(b) by 145 days.

(21) Appl. No.: 11/767,553

(22) Filed: Jun. 25, 2007

(65) Prior Publication Data

US 2008/0314021 A1    Dec. 25, 2008

(51) Int. Cl.
*F01N 3/00* (2006.01)
(52) U.S. Cl. .............. 60/295; 60/274; 60/278; 60/280; 60/286; 60/297; 60/311
(58) Field of Classification Search .......... 60/286, 60/295, 311, 274, 278, 280, 297, 303
See application file for complete search history.

(56) References Cited

U.S. PATENT DOCUMENTS

| | | | |
|---|---|---|---|
| 6,622,480 B2 * | 9/2003 | Tashiro et al. ............... 60/295 |
| 6,854,265 B2 | 2/2005 | Saito et al. |
| 6,901,747 B2 * | 6/2005 | Tashiro et al. ............... 60/286 |
| RE38,888 E * | 11/2005 | Beall et al. .................. 501/119 |
| 6,959,541 B2 * | 11/2005 | Kosaka et al. ............... 60/295 |
| 6,978,604 B2 | 12/2005 | Wang et al. |
| 7,062,907 B2 * | 6/2006 | Kitahara ....................... 60/295 |
| 7,076,945 B2 | 7/2006 | Sisken et al. |
| 7,086,220 B2 * | 8/2006 | Imai et al. .................... 60/274 |
| 7,104,049 B2 * | 9/2006 | Hiranuma et al. ............. 60/295 |
| 7,104,051 B2 * | 9/2006 | Shimasaki et al. ............ 60/297 |
| 7,111,591 B2 | 9/2006 | Schwab et al. |
| 7,134,405 B2 | 11/2006 | Vincent et al. |
| 7,197,868 B2 | 4/2007 | Yahata et al. |
| 7,207,171 B2 * | 4/2007 | Nagaoka et al. .............. 60/295 |
| 7,210,286 B2 | 5/2007 | Sun et al. |
| 7,231,761 B2 * | 6/2007 | Okugawa et al. ............. 60/295 |
| 7,419,532 B2 * | 9/2008 | Sellers et al. ................ 95/273 |
| 7,484,360 B2 * | 2/2009 | Tominaga .................... 60/295 |
| 2003/0131592 A1 * | 7/2003 | Saito et al. .................... 60/295 |
| 2005/0044846 A1 * | 3/2005 | Yahata et al. ................. 60/295 |
| 2006/0130459 A1 | 6/2006 | Warner et al. |
| 2006/0130460 A1 | 6/2006 | Warner |
| 2006/0130465 A1 | 6/2006 | Sun et al. |
| 2006/0225411 A1 * | 10/2006 | Kanazawa et al. ............ 60/299 |
| 2007/0074508 A1 | 4/2007 | Tomlins et al. |
| 2007/0119128 A1 * | 5/2007 | Tochikawa et al. ......... 55/282.3 |

* cited by examiner

*Primary Examiner*—Binh Q. Tran
(74) *Attorney, Agent, or Firm*—Bill C. Panagos; Rader, Fishman & Grauer PLLC

(57) ABSTRACT

A method for determining a time duration and an amount of fuel to include within exhaust gases to facilitate sintering of ash within a diesel particulate filter to reopen ash filled channels in said diesel particulate filter.

7 Claims, 2 Drawing Sheets

METHOD TO RE-OPEN ASH FILLED CHANNELS IN DIESEL PARTICULATE FILTERS

BACKGROUND OF THE INVENTION

1. Field of the Invention

The present invention relates to systems and methods for controlling fuel included within exhaust gases to facilitate regeneration of a particulate filter.

The present invention further relates to systems and methods to re-open ash filled channels in Diesel Particulate Filters by increasing the temperature within the Diesel Particulate Filter in response to an indication that one or more of the channels in the DFP are filled with Ash to sinter the ash in the channels, thereby reducing the volume of the ash to fraction of its unsintered volume to substantially re-open channels in DPFs.

The present invention further relates to systems and methods to re-open ash filled channels in DPFs by controlling the temperature in the DPF to exceed 700° C. to 1,000° C. in a controlled manner for a period of time sufficient to sinter any ash in the DPF to reduce the volume of such ash and re-open any plugged channels within the DPF. By controlling the temperature and time, it has been determined that the catalytic coating within the DPF is not significantly affected and that the ash is sintered into very small patches that are adhered to the walls of the DPF, thereby opening the channels and extending the life of the DPF.

2. Background Art

A particulate filter is a device for capturing particulates emitted in exhaust gases from a combustion engine. In some systems employing a particulate filter, it may be desired to oxidize or burn the captured particulates in a process commonly referred to as regeneration. The regeneration of the particulates is dependent on temperatures at the particulate filter, which may be influenced by exhaust gas fuel levels. In the past, it has been known to increase the temperature within the DPF to oxidize any particulate matter trapped therein and to permit the ash in the DPF to be effectively transported to the end of the channels to reduce the ash volume until the ash fills the channels within the DPF, thereby necessitating a replacement or cleaning of the DPF.

The temperature within the DPF has been increased by changing engine operation to increase the temperature of the exhaust gas, or by use of a fuel doser to introduce fuel into the exhaust stream to increase the temperature within the DPF. In the past, it has been a concern within the art that the temperature within the DPF cannot exceed about 450-650° C. because of the danger of uncontrolled oxidation of the particulate material trapped in the DPF, and further because temperatures in excess of this range may damage the catalytic coating within the DPF, thereby reducing its effectiveness, assuming the DPF has been catalytically coated.

Accordingly regeneration efforts have been directed at a controlled oxidation of trapped diesel particulate material to reduce its volume and permit continued operation of the DPF. However, regeneration of the DPF does not remove the ash that eventually plugs the channels of the DPF, thereby necessitating replacement or cleaning of the DPF.

Accordingly, a need exists to control the increase in temperature of the DPF to 700° C. to 1,000° C. for a short period to sinter the ash within the DPF, further reducing its volume to a fraction of its unsintered form, thereby effectively re-opening ash plugged channels in the DPF and extending the life of the DPF. In addition, a need exists to control the increase in temperature to 700° C. to 1,000° C. for a controlled period of time in order to minimize the adverse affect the catalytic coating on the walls of the DPF, thereby effectively extending the life of the DPF.

SUMMARY OF THE INVENTION

One non-limiting aspect of the present invention relates to determining an amount of fuel to be included within exhaust gases to facilitate regeneration of a particulate filter used to capture particulates emitted from an engine by sintering ash within the DPF to reopen any plugged channels within the DPF without significantly affecting the catalytic coatings within the DPF channels.

On diesel engines equipped with diesel particulate filters (DPFs), the filters will fill with ash over time. This ash has the effect of filling channels which both increase flow restriction through the filter and reduces the space available to hold soot, which increases the likelihood of filter failure due to excessive soot quantities on the filter. In general, ash is a relatively light and fluffy substance that has a relatively low packing factor and low density. When ash is sintered at high temperature, it forms into a much denser, hard, permanent substance with a density perhaps 100 times higher than unsintered ash. Thus, for example, if the back 3 inches of a channel is filled with ash, this same channel after sintering will appear fully open, with small patches of sintered ash permanently adhered to the wall, blocking a small portion of the flow area. However, the channel will be open and an estimated 90% of the filter wall area will be clear and open for flow. The sintered ash will be bonded to the wall of the DPF.

In accordance with one non-limiting aspect of the present invention, the amount of fuel to include within the exhaust gases may be determined by a controller and the controller may be configured to control system components to inject or otherwise included the fuel within the exhaust gases, such as by controlling fuel injection from a doser, fuel emitted with exhaust gases from the engine, and the like.

In accordance with one non-limiting aspect of the present invention, the amount of fuel included within the exhaust gases may be determined as function of an open loop fuel injection control strategy and a closed loop fuel injection control strategy wherein the closed loop fuel injection control strategy fine tunes the amount of fuel injected according to the open loop control strategy.

In accordance with one non-limiting aspect of the present invention, the closed loop control strategy determines an amount of the fuel to include within the exhaust gas based on sensing temperatures at the particulate filter such that the closed loop control strategy adds more fuel to the amount of fuel determined according to the open loop control strategy if the sensed temperature is less than a desired temperature and subtracts fuel from the amount of fuel determined according to the open loop control strategy if the sensed temperature is greater than the desired temperature.

In accordance with one non-limiting aspect of the present invention, the close loop control strategy may compensate for sensor delay associated with sensing the temperature at the particulate filter, such as to compensate for sensor delays caused by thermal inertia and the like.

In accordance with one non-limiting aspect of the present invention, the amount of fuel included within the exhaust gases may be determined as a function of an open loop emissions control strategy which limits fuel included within the exhaust gases so as to prevent slippage of unburned fuel out of the particulate filter and into to the environment.

The above features and advantages, along with other features and advantages of the present invention, are readily apparent from the following detailed description of the invention when taken in connection with the accompanying drawings.

DETAILED DESCRIPTION OF THE PREFERRED EMBODIMENT(S)

Figure 1:
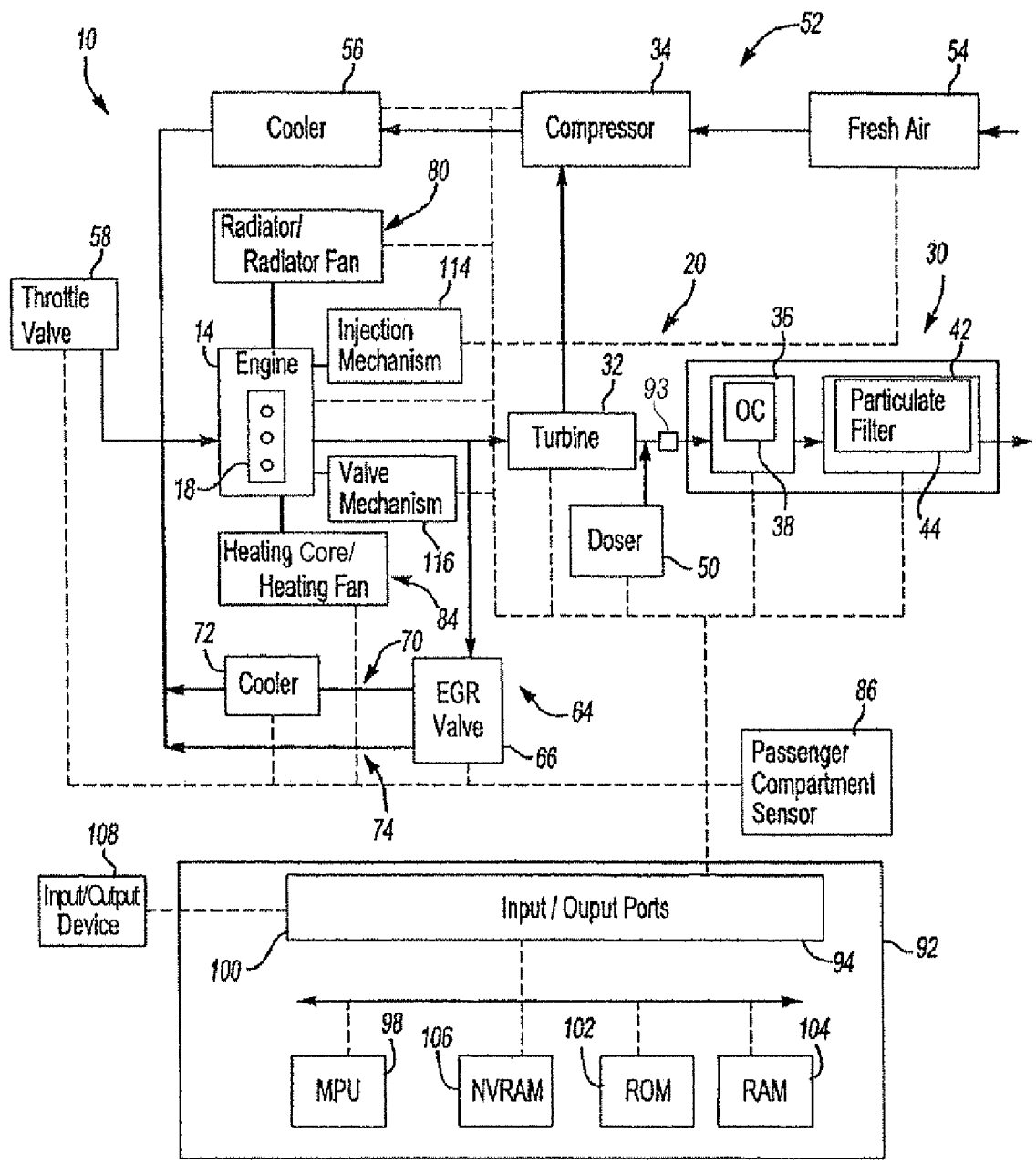
FIG. 1 illustrates a system in accordance with one non-limiting aspect of the present invention.

FIG. 1 illustrates a vehicle powertrain system 10 in accordance with one non-limiting aspect of the present invention. The system 10 may provide power for driving any number of vehicles, including on-highway trucks, construction equipment, marine vessels, stationary generators, automobiles, trucks, tractor-trailers, boats, recreational vehicle, light and heavy-duty work vehicles, and the like.

The system 10 may be referred to as an internal combustion driven system wherein fuels, such as gasoline and diesel fuels, are burned in a combustion process to provide power, such as with a spark or compression ignition engine 14. The engine 14 may be a diesel engine that includes a number of cylinders 18 into which fuel and air are injected for ignition as one skilled in the art will appreciate. The engine 14 may be a multi-cylinder compression ignition internal combustion engine, such as a 4, 6, 8, 12, 16, or 24 cylinder diesel engines, for example. It should be noted, however, that the present invention is not limited to a particular type of engine or fuel.

Exhaust gases generated by the engine 14 during combustion may be emitted through an exhaust system 20. The exhaust system 20 may include any number of features, including an exhaust manifold and passageways to deliver the emitted exhaust gases to a particulate filter assembly 30, which in the case of diesel engines is commonly referred to as a diesel particulate filter. Optionally, the system 20 may include a turbocharger proximate the exhaust manifold for compressing fresh air delivery into the engine 14. The turbocharger, for example, may include a turbine 32 and a compressor 34, such as a variable geometry turbocharger (VGT) and/or a turbo compound power turbine. Of course, the present invention is not limited to exhaust systems having turbochargers or the like.

The particulate filter assembly 30 may be configured to capture particulates associated with the combustion process. In more detail, the particulate filter assembly 30 may include an oxidation catalyst (OC) canister 36, which in includes an OC 38, and a particulate filter canister 42, which includes a particulate filter 44. The canisters 36, 42 may be separate components joined together with a clamp or other feature such that the canisters 36, 42 may be separated for servicing and other operations. Of course, the present invention is not intended to be limited to this exemplary configuration for the particulate filter assembly 30. Rather, the present invention contemplates the particulate filter assembly including more or less of these components and features. In particular, the present invention contemplates the particulate filter assembly 30 including only the particulate filter 44 and not necessarily the OC canister 36 or substrate 38 and that the particulate filter 44 may be located in other portions of the exhaust system 20, such as upstream of the turbine 32.

The OC 38, which for diesel engines is commonly referred to as a diesel oxidation catalyst, may oxidize hydrocarbons and carbon monoxide included within the exhaust gases so as to increase temperatures at the particulate filter 44. The particulate filter 44 may capture particulates included within the exhaust gases, such as carbon, oil particles, ash, and the like, and regenerate the captured particulates if temperatures associated therewith are sufficiently high. In accordance with one non-limiting aspect of the present invention, one object of the particulate filter assembly 30 is to capture harmful carbonaceous particles included in the exhaust gases and to store these contaminates until temperatures at the particulate filter 44 favor oxidation of the captured particulates into a gas that can be discharged to the atmosphere.

The OC and particulate filter canisters 36, 42 may include inlets and outlets having defined cross-sectional areas with expansive portions there between to store the OC 38 and particulate filter 44, respectively. However, the present invention contemplates that the canisters 36, 42 and devices therein may include any number configurations and arrangements for oxidizing emissions and capturing particulates. As such, the present invention is not intended to be limited to any particular configuration for the particulate filter assembly 30.

To facilitate oxidizing the capture particulates, a doser 50 may be included to introduce fuel to the exhaust gases such that the fuel reacts with the OC 38 and combusts to increase temperatures at the particulate filter 44, such as to facilitate regeneration. For example, one non-limiting aspect of the present invention contemplates controlling the amount of fuel injected from the doser as a function of temperatures at the particulate filter 44 and other system parameters, such as air mass flow, EGR temperatures, and the like, so as to control regeneration. However, the present invention also contemplates that fuel may be included within the exhaust gases through other measures, such as by controlling the engine 14 to emit fuel with the exhaust gases.

An air intake system 52 may be included for delivering fresh air from a fresh air inlet 54 through an air passage to an intake manifold for introduction to the engine 14. In addition, the system 52 may include an air cooler or charge air cooler 56 to cool the fresh air after it is compressed by the compressor 34. Optionally, a throttle intake valve 58 may be provided to control the flow of fresh air to the engine 14. Optionally, the throttle intake valve 58 may also be provided to control the flow of EGR gases to the engine 14 or control both fresh air and EGR gases 64 to the engine 14. The throttle valve 58 may be a manually or electrically operated valve, such as one which is responsive to a pedal position of a throttle pedal operated by a driver of the vehicle. There are many variations possible for such an air intake system and the present invention is not intended to be limited to any particular arrangement. Rather, the present invention contemplates any number of features and devices for providing fresh air to the intake manifold and cylinders, including more or less of the foregoing features.

An exhaust gas recirculation (EGR) system 64 may be optionally provided to recycle exhaust gas to the engine 14 for mixture with the fresh air. The EGR system 64 may selectively introduce a metered portion of the exhaust gasses into the engine 14. The EGR system 64, for example, may dilute the incoming air charge and lower peak combustion temperatures to reduce the amount of oxides of nitrogen produced during combustion. The amount of exhaust gas to be recirculated may be controlled by controlling an EGR valve 66 and/or in combination with other features, such as the turbocharger. The EGR valve 66 may be a variable flow valve that is electronically controlled. There are many possible configurations for the controllable EGR valve 66 and embodiments of the present invention are not limited to any particular structure for the EGR valve 66.

The EGR system 64 in one non-limiting aspect of the present invention may include an EGR cooler passage 70, which includes an EGR cooler 72, and an EGR cooler bypass 74. The EGR valve 66 may be provided at the exhaust manifold to meter exhaust gas through one or both of the EGR cooler passage 70 and bypass 74. Of course, the present invention contemplates that the FOR system 64 may include more or less of these features and other features for recycling exhaust gas. Accordingly, the present invention is not intended to be limited to any one EGR system and contemplates the use of other such systems, including more or less of these features, such as an EGR system having only one of the EGR cooler passage or bypass.

A cooling system 80 may be included for cycling the engine 14 by cycling coolant there through. The coolant may be sufficient for fluidly conducting away heat generated by the engine 14, such as through a radiator. The radiator may include a number of fins through which the coolant flows to be cooled by air flow through an engine housing and/or generated by a radiator fan directed thereto as one skilled in the art will appreciated. It is contemplated, however, that the present invention may include more or less of these features in the cooling system 80 and the present invention is not intended to be limited to the exemplary cooling system described above.

The cooling system 80 may operate in conjunction with a heating system 84. The heating system 84 may include a heating core, a heating fan, and a heater valve. The heating core may receive heated coolant fluid from the engine 14 through the heater valve so that the heating fan, which may be electrically controllable by occupants in a passenger area or cab of a vehicle, may blow air warmed by the heating core to the passengers. For example, the heating fan may be controllable at various speeds to control an amount of warmed air blown past the heating core whereby the warmed air may then be distributed through a venting system to the occupants. Optionally, sensors and switches 86 may be included in the passenger area to control the heating demands of the occupants. The switches and sensors may include dial or digital switches for requesting heating and sensors for determining whether the requested heating demand was met. The present invention contemplates that more or less of these features may be included in the heating system and is not intended to be limited to the exemplary heating system described above.

A controller 92, such as an electronic control module or engine control module, may be included in the system 10 to control various operations of the engine 14 and other system or subsystems associated therewith, such as the sensors in the exhaust, EGR, and intake systems. Various sensors may be in electrical communication with the controller via input/output ports 94. The controller 92 may include a microprocessor unit (MPU) 98 in communication with various computer readable storage media via a data and control bus 100. The computer readable storage media may include any of a number of known devices which function as read only memory 102, random access memory 104, and non-volatile random access memory 106. A data, diagnostics, and programming input and output device 108 may also be selectively connected to the controller via a plug to exchange various information there between. The device 108 may be used to change values within the computer readable storage media, such as configuration settings, calibration variables, instructions for EGR, intake, and exhaust systems control and others.

The system 10 may include an injection mechanism 114 for controlling fuel and/or air injection for the cylinders 18. The injection mechanism 114 may be controlled by the controller 92 or other controller and comprise any number of features, including features for injecting fuel and/or air into a common-rail cylinder intake and a unit that injects fuel and/or air into each cylinder individually. For example, the injection mechanism 114 may separately and independently control the fuel and/or air injected into each cylinder such that each cylinder may be separately and independently controlled to receive varying amounts of fuel and/or air or no fuel and/or air at all. Of course, the present invention contemplates that the injection mechanism 114 may include more or less of these features and is not intended to be limited to the features described above.

The system 10 may include a valve mechanism 116 for controlling valve timing of the cylinders 18, such as to control air flow into and exhaust flow out of the cylinders 18. The valve mechanism 116 may be controlled by the controller 92 or other controller and comprise any number of features, including features for selectively and independently opening and closing cylinder intake and/or exhaust valves. For example, the valve mechanism 116 may independently control the exhaust valve timing of each cylinder such that the exhaust and/or intake valves may be independently opened and closed at controllable intervals, such as with a compression brake. Of course, the present invention contemplates that the valve mechanism may include more or less of these features and is not intended to be limited to the features described above.

In operation, the controller 92 receives signals from various engine/vehicle sensors and executes control logic embedded in hardware and/or software to control the system 10. The computer readable storage media may, for example, include instructions stored thereon that are executable by the controller 92 to perform methods of controlling all features and sub-systems in the system 10. The program instructions may be executed by the controller in the MPU 98 to control the various systems and subsystems of the engine and/or vehicle through the input/output ports 94. In general, the dashed lines shown in FIG. 1 illustrate the optional sensing and control communication between the controller and the various components in the powertrain system. Furthermore, it is appreciated that any number of sensors and features may be associated with each feature in the system for monitoring and controlling the operation thereof.

In one non-limiting aspect of the present invention, the controller 92 may be the DDEC controller available from Detroit Diesel Corporation, Detroit, Mich. Various other features of this controller are described in detail in a number of U.S. patents assigned to Detroit Diesel Corporation. Further, the controller may include any of a number of programming and processing techniques or strategies to control any feature in the system 10. Moreover, the present invention contemplates that the system may include more than one controller, such as separate controllers for controlling system or subsystems, including an exhaust system controller to control exhaust gas temperatures, mass flow rates, and other features associated therewith. In addition, these controllers may include other controllers besides the DDEC controller described above.

In accordance with one non-limiting aspect of the present invention, the controller 92 or other feature, such as regeneration system controller, may be configured for determining a desired exhaust gas temperature at the particulate filter and/or a particulate filter substrate temperature to facilitate regeneration of the particulate filter whereby particulates captured by the particulate filter are oxidized or otherwise burned. The disposal of the particulates in this manner may be advantageous to prevent clogging and filling of the particulate filter so that the exhaust gases may pass there through with minimal restriction and yet permit additional particulates to be collected.

In accordance with one non-limiting aspect of the present invention, the controller 92, or the regeneration controller, receive data signals from a sensor, such as an exhaust pressure sensor 93, to determine that one or more of the channels in the DPF may be filled with particulate material. The controller may initiate active or passive regeneration of the DPF in order to oxidize the particulate material in a controlled manner to reduce its volume. If, after regeneration, the exhaust pressure sensor indicates that there is ash filling one more passages in the DPF, the controller 92 may be configured to determine an additional amount of fuel to be included within the exhaust gases as a function of the desired temperature, such as with fuel injection from the doser 50, with fuel emitted from the engine 14, or otherwise, to increase the temperature within the DPF to about 700° C. to 1,000° C. to sinter the ash. Sintering the ash further reduces its volume to a small fraction of the volume of unsintered ash, thereby opening ash filled passages in the DPF and extending the life of the DPF. In addition, the sintered ash forms small hardened pocks on the walls of the DPF, thereby ensuring the ash will not be expelled into the atmosphere.

In more detail, the present invention contemplates controlling amounts of fuel included within the exhaust gases so as to facilitate combustion of the fuel at the OC 38, and thereby, increasing temperatures at the particulate filter 44. The use of fuel injection to control temperatures at the particulate filter 44 in this manner is advantageous to achieving the desired temperatures at the particulate filter 44 and thereby the desired particulate filter regeneration. Furthermore, after regeneration is completed, the exhaust pressure sensor senses whether there is plugged channel within the DPF and transmit that information to the controller. The controller then uses the information provided to control the amount of, and duration of, fuel injection into the exhaust stream to increase the temperature within the DPF to 700° C. to 1,000° C. to sinter the ash within the DPF, thereby further reducing its volume and re-opening any ash filled channels within the DPF. The time during which the DPF is heated to 700° C. to 1,000° C. varies, based upon the amount of ash that is required to be sintered. For these purposes, it is contemplated that the temperature will be elevated for about one to about ten minutes to sinter the ash to reopen ash filled channels in the DPF. For exemplary purposes, the description below relates to controlling fuel injected from the doser, however, the present invention, as described above, is not intended to be so limited and contemplates any number of other features for providing fuel into the exhaust gases, including controlling engine fuel injection and valve timing so as to control fuel emitted with the engine exhaust gases.

Methods to determine the need to reopen ash plugged channels can also be based on miles since the last ash cleaning or other methods such as total engine hours, fuel burned, oil consumed, etc.

Figure 2:
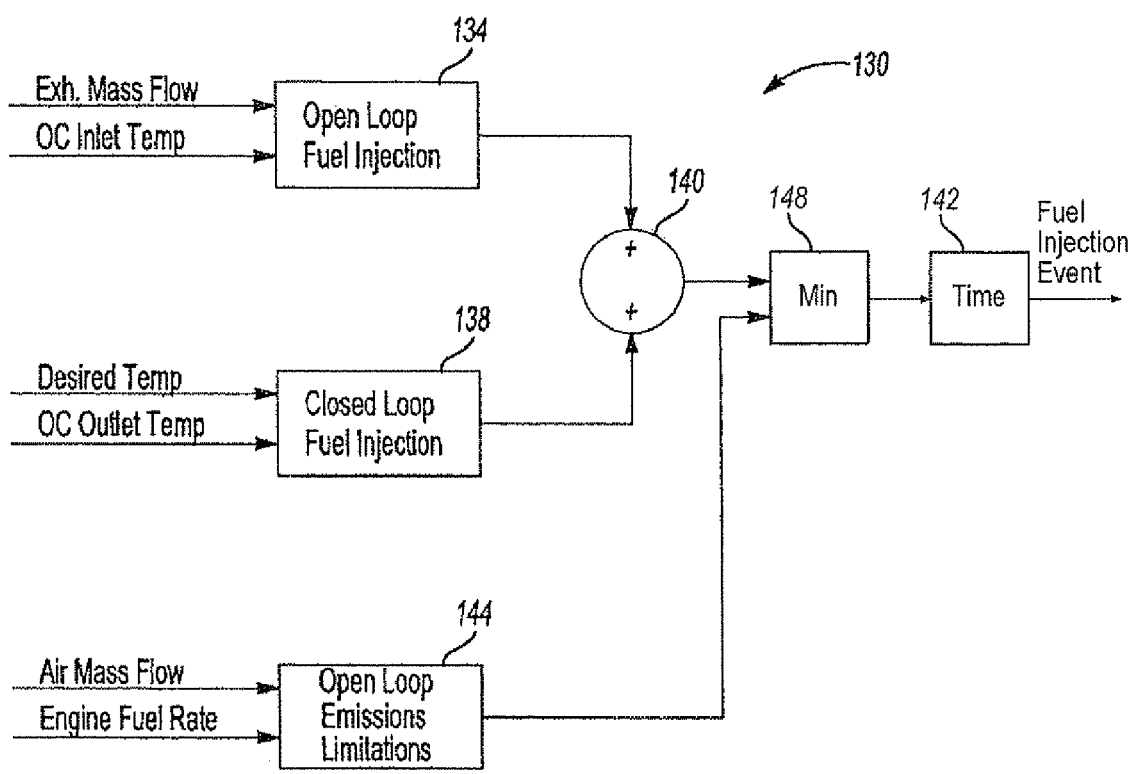
FIG. 2 illustrates a flowchart of a method for controlling fuel included within exhaust gases to facilitate regeneration of a particulate filter in accordance with one non-limiting aspect of the present invention.

FIG. 2 illustrates a flowchart 130 of a method for controlling fuel injection included within the exhaust gases to facilitate regeneration of a particulate filter in accordance with one non-limiting aspect of the present invention. The method may relate to controlling an amount of fuel injected from a doser, and amount of fuel ejected from the engine with the exhaust gases, and/or fuel injected into the exhaust gases from other features not described above. In general, the method relates to determining the amount of fuel and the duration of fuel injection according to an open loop fuel injection control strategy and adjusting the amount and duration of injected fuel with one or both of a closed loop fuel injection control strategy and an open loop emissions control strategy.

Block 134 relates to determining a first fuel injection value as a function of an open loop fuel injection control strategy. In accordance with one non-limiting aspect of the present invention, the open loop fuel injection control strategy determines the first fuel injection value as a function of exhaust gas mass flow and inlet exhaust temperatures of the DPF which may be determined with sensors and/or calculated. Of course, the present invention contemplates the use of other inputs to determine the first fuel injection value.

In more detail, the open loop control strategy may be characterized as a process wherein a look-up table or algorithm is utilized to determined the first fuel injection value as a function of the input variables. This type of open loop fuel control is advantageous because it allows rapid responses and updates to fuel injection, which is especially advantageous during transient conditions when the amount of fuel must be rapidly adjusted to compensate for changes in operation. The look-up table or other logic may be based on desired DPF outlet temperatures associated with regeneration of the particulate filter such that the input variables are correlated with doser fuel quantities that are likely to produce the desired DPF outlet temperatures. For example, the desired DPF outlet temperatures may be based on the material properties and characteristics of the particulate filter so that the temperatures of the exhaust gases flowing out of the DPF and to the particulate filter are sufficient to regenerate the particulate filter, which may require temperatures around 550° C. and above.

Block 138 relates to determining a second fuel injection value as a function of a closed loop fuel injection control strategy. In accordance with one non-limiting aspect of the present invention, the closed loop fuel control strategy determines the second fuel injection value as a function of sensed outlet exhaust gas temperatures of the OC being adjusted to compensate for sensor delay, whereby the second doser value is then determined as function of a difference between the adjusted, sensed OC temperature and the desired OC temperature required to facilitate regeneration of the particulate filter. Of course, the present invention contemplates the use of other inputs to determine the second fuel injection value.

In more detail, the closed loop control strategy may be characterized as a multi-step process that firstly adjusts the sensed OC outlet temperature to compensate for sensor delay, secondly determines a difference between the adjusted OC temperature value and the desired OC temperature value, and thirdly determines the second doser value as a function of the difference, which may be determined from a look-up table or through other logic that correlates fuel injection quantities as a function of the different between the adjusted, sensed OC temperature and the desired OC temperature. As described below in more detail, any difference in temperature between the desired DPF temperature and that associated with the first doser injection amount is compensated for by using the second fuel injection value to add or subtract from the amount of fuel injected by the doser.

Block 140 relates to adjusting the first fuel injection value as a function of the second fuel injection value. In accordance with one non-limiting aspect of the present invention, the adjusting may be performed in a summing operation wherein the second fuel injection value is added or subtracted from the first fuel injection value depending on whether the second fuel injection value is negative (indicating the sensed OC temperature is greater than the desired OC temperature and therefore less fuel is needed) or positive (indicating the sensed OC temperature is less than the desired OC temperature and therefore more fuel is needed).

In accordance with one non-limiting aspect of the present invention, the use of the second fuel injection value to adjust the first fuel injection value may be limited to steady-state operation where rapid responses to changing operation conditions may be limited. Of course, the present invention is not intended to be limited to steady-state operation and contemplates that steady-state operation may be determined according to any number of parameters, such as by defining at time period in which the first fuel injection value must output a value within a predefined range and the like.

Block 144 relates to determining a third fuel injection value as a function of an open loop emissions fuel injection control strategy. In accordance with one non-limiting aspect of the present invention, the open loop emissions fuel injection control strategy determines the third fuel injection value as a function of air mass flow to the engine and engine fuel rates. Of course, the present invention contemplates the use of other inputs to determine the third fuel injection value.

In more detail, the open loop emissions fuel injection control strategy may be characterized as a process wherein a look-up table, algorithm, or the like is utilized to determined the third fuel injection value as a function of the input variables. This type of open loop fuel control is advantageous because it allows rapid responses and updates to fuel injection, which is especially advantageous during transient conditions when the amount of fuel injected from the doser must be rapidly adjusted to compensate for changes in operation.

The emissions control strategy look-up table or other logic may be utilized to adjust the amount of fuel to inject from the doser as a function of oxygen content in the exhaust gases so as to limit slippage of fuel into the environment. In particular, and in accordance with one non-limiting aspect of the present invention, the third fuel injection value corresponds with a maximum amount of fuel to inject from the doser given the air mass flow and engine fuel rates. These values may be determined according to any number of parameters and may generally relate to benchmarked or other empirically determined parameters associated with fuel slippage. Of course, the present invention contemplates determining such values according to any number of means and is not intended to be limited to a look-up table or any other open loop control strategy.

Block 142 relates to determining a duration of time for the introduction of fuel into the exhaust gasses to facilitate sintering of the ash within the DPF. Specifically, the temperature and the pressure in the DPF are constantly monitored. When the temperature of the DPF reaches 700 to 1000° C. the introduction of fuel is stopped; the pressure is monitored to determine whether it has reached a threshold indicating that the channels are re-opened by the sintering of the ash. If the pressure is not indicative of a reopening, the fuel in reintroduced until the temperature in the DPF reaches 700-1000° C. and the pressure is constantly monitored until it indicates that the channels are reopened, indicating that the ash has sintered. The fuel is then stopped and the DPF allowed to cool.

It is also conceived that the time duration for sintering the ash will be a predetermined amount of time and not based on the pressure drop across the DPF.

Block 148 relates to determining an amount of fuel to include within the exhaust gases as a function of the adjusted first fuel injection and the third fuel injection value in accordance with one aspect of the present invention. In accordance with one non-limiting aspect of the present invention, the amount of fuel to inject from the doser may be the lesser of the adjusted first fuel injection value and the second fuel injection value so as to prevent slippage of fuel into the environment.

As described above, the present invention contemplates utilizing the closed loop fuel injection control strategy to fine tune or otherwise adjust the amount of fuel injected according to the open loop fuel injection control strategy so that fuel may be controllably injected into the exhaust gases to control temperatures within the particulate filter canister, such as to generate temperatures approximately equal to, and in some cases without substantially surpassing, the desired OC outlet temperature so as to facilitate regeneration and prevent heat damage to the particulate filter.

In accordance with one non-limiting aspect of the present invention, the dichotomy between open and closed loop control is characterized by the open loop control receiving variable inputs and determining an output there from without additional variables adjusting or otherwise influencing the output. In contrast, the closed loop control receives variable inputs and compares the inputs to a desired or set-point standard prior to determining the output.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed as new and desired to be protected by Letters Patent of the United States is:

1. A method of opening ash filled channels in a diesel particulate filter, where the ash occupies a first volume within the channels, the method comprising:
   determining whether channels of a diesel particulate filter are blocked, wherein the blockage would be created by ash within the channels of the filter, the ash having a first volume;
   intentionally increasing temperature within the diesel particulate filter to a temperature sufficient to sinter the ash within the filter, such that the sintered ash has a second volume, the second volume being less than the first volume.

2. A method as in claim 1 wherein an exhaust sensor is used to determine whether the channels of the diesel particulate filter are blocked.

3. A method as in claim 1 wherein prior to increasing the temperate to a level sufficient to sinter ash particles the method further comprises:
   oxidizing particulates within the diesel particulate filter to create ash.

4. A method as in claim 3 wherein the particulates are oxidized through active regeneration, wherein the active regeneration includes dosing a first amount of fuel into the diesel particulate filter.

5. A method as in claim 4 wherein the ash is sintered by dosing a second amount of fuel into the diesel particulate filter.

6. A method as in claim 1 further comprising:
   determining a first fuel injection value as a function of an open loop fuel injection strategy;
   determining a second fuel injection value as a function of a closed loop injection control strategy;
   adjusting the first fuel injection value as a function of the second fuel injection value;
   determining a duration of time for fuel injection into the exhaust gases;

determining an amount of fuel to include within the exhaust gases to facilitate sintering of ash in said diesel particulate filter as a function of temperature and pressure.

7. A method as in claim 6 wherein the temperature is between 700 and 1000 degrees C.